United States Patent

[11] 3,537,406

[72] Inventor  Lewis John Ort
              P.O. Box 3277, La Vale, Maryland 21502
[21] Appl. No. 736,394
[22] Filed     June 12, 1968
[45] Patented  Nov. 3, 1970

[54] DECORATING BREAD PRODUCTS
     8 Claims, 3 Drawing Figs.
[52] U.S. Cl. .................................................. 107/54,
                                                              118/13
[51] Int. Cl. ....................................................... A21d 2/00
[50] Field of Search............................................. 107/54,
        54.1, 54.28, 54.7; 117/8, 8.5; 99/905, 148; 118/13;
        99/(Inquired Hoffman); 101/(Inquired Penn)

[56] References Cited
     UNITED STATES PATENTS
     654,474    7/1900  Mercer.......................... 117/8
     2,147,098  2/1939  Humphrey.................... 99/90
     3,385,237  5/1968  Brunson et al................ 107/54.7

*Primary Examiner*—William I. Price
*Assistant Examiner*—Robert I. Smith
*Attorney*—Irons, Birch, Swindler and McKie

ABSTRACT: Decorated bread products such as rolls or the like are produced by silk screening a design on half proof rolls. Thereafter the raising process is completed to enlarge the designs as the rolls swell. The rolls are then baked in a conventional manner.

Patented Nov. 3, 1970

3,537,406

INVENTOR
LEWIS J. ORT

BY Irons, Birch, Swindler & McKie

ATTORNEYS.

3,537,406

DECORATING BREAD PRODUCTS

BACKGROUND OF THE INVENTION

This invention relates to the baking art and particularly to the decoration of bread products such as rolls or the like.

It is a very important object of the instant invention to provide a process for decorating bread products such as rolls or the like wherein the decoration is applied prior to baking so that the same will become substantially permanently embedded in the crust of the product during the baking operation.

Another very important object of the invention is the provision of such a method for use in the production of leavened products wherein the decoration is applied prior to full raising of the product so that a relatively small decoration may be applied, the decoration thereafter becoming enlarged as the raising of the product is completed. In this connection, the decoration will become embedded in the surface of the product as the dough expands and stretches the decoration. Furthermore, the apparatus utilized for applying the decorations may be significantly smaller and therefore less expensive to purchase, operate and maintain than similar apparatus for applying decorations only after the products have been fully raised and baked.

SUMMARY OF THE INVENTION

In one of its broadest aspects, the instant invention provides a method for producing a leavened food product having decorative indicia thereon. The method comprises a number of interrelated steps. Firstly, a soft doughy mass of edible, starchy material, including a leavening agent, is prepared. Thereafter and before the mass is raised completely under the action of the leavening agent, indicia is imprinted on the mass with an edible fluid. The imprinted mass is then exposed to conditions conducive to causing the mass to raise and thereby enlarge the indicia. After the raising of the mass is complete, the same, with the enlarged indicia thereon, is baked to produce the decorated product.

DETAILED DESCRIPTION OF THE INVENTION

Figure 1:
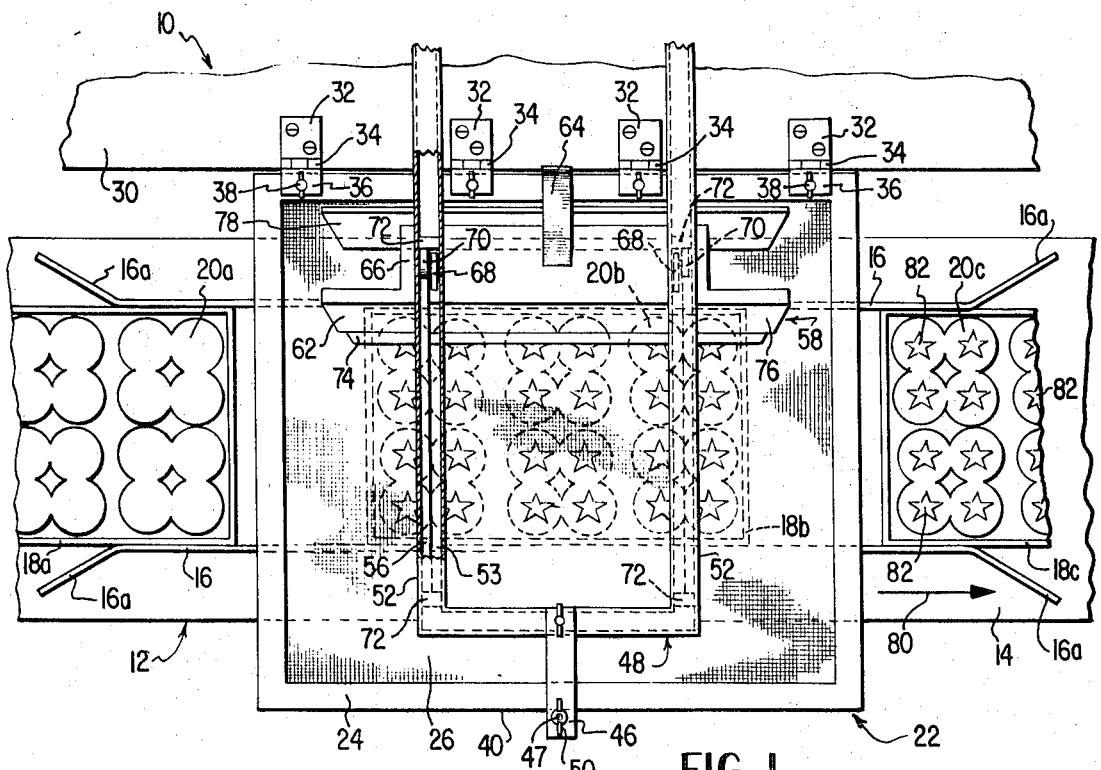
FIG. 1 is a top plan view of apparatus designed for carrying out the process of the invention.

An apparatus designed for carrying out the process of the instant invention is broadly designated by the numeral 10. Apparatus 10 includes a conveyor 12 having an endless conveyor belt 14 which is driven by conventional mechanism (not shown). A pair of opposed, horizontally spaced, parallel guide bars 16 are located above belt 14 in slightly spaced relationship thereto and each bar 16 has an outwardly flared portion 16a at each end thereof for positioning trays 18a, 18b and 18c of bread rolls 20a, 20b and 20c at proper locations for being imprinted by an imprinting mechanism 22. In this respect, it can be seen that tray 18b with rolls 20b thereon is in position for being imprinted by mechanism 22.

Mechanism 22 includes a rectangular frame 24 having a silk screen 26 attached thereto by conventional means such as rivets 28. Frame 24 is connected to a support table 30 (shown only fragmentarily) by hinges 32 for swinging about a horizontal axis defined by the pivot pins 34 of hinges 32 toward and away from tray 18b and rolls 20b. Hinges 32 include an L-shaped bracket 36 and an adjustable screw 38 to facilitate proper vertical positioning of frame 24 and thereby screen 26.

The outer end 40 of frame 24 is supported by a chain 42 which extends between a pin 44 on end 40 and a tab 46 carried on a cantilever framework 48. Chain 42 is connected to tab 46 by an eye-bolt 47 and thumb screw 50 to further facilitate proper vertical positioning of screen 26. Framework 48 is also pivotally supported on table 30 for swinging about a horizontal axis.

Framework 48 includes a pair of horizontally spaced, generally parallel side rails 52, each being hollow and transversely rectangular. Each rail 52 is also provided with a longitudinally extending slot 53 in the under side 54 thereof presenting an elongated track 56 within rail 52.

A fluid distributing assembly 58 is provided for forcing a colored decorating fluid 60 through the openings of screen 26. In this respect, it is to be appreciated that screen 26 is originally foraminous with selected of its openings being closed by a sealant so that only the remaining openings thereof, which are arranged in a definite pattern, are available for passage of fluid therethrough.

Assembly 58 includes a transversely L-shaped block 62, an operating lever 64 extending upwardly from the upper portion 66 of block 62 and a pair of horizontally spaced legs 68 which also extend upwardly from portion 66. Each leg 68 extends through a corresponding slot 53 and carries a rotatable wheel 70 which is located for rolling movement along a corresponding track 56 within the confines of the corresponding rail 52. In this respect, it is to be noted that each rail 52 is provided with a pair of stops 72 at respective opposite ends of slot 53 for limiting the longitudinal movement of the corresponding wheel 70 and thereby of assembly 58.

A squeegee 74 adjacent screen 26 is carried at the end of the lower portion 76 of block 62 remote from portion 66. A coater blade 78 which is also adjacent screen 26 is carried at the end of portion 66 remote from portion 76. Squeegee 74 and blade 78 are elongated and extend across a substantial extent of the width of screen 26.

In operation, belt 14 moves trays 18 in the direction of the arrow 80 in FIG. 1. The rolls 20 are composed of a soft doughy mass of edible starchy material including a leavening agent. That is to say, the rolls 20 are of an unbaked bread like dough. The undecorated rolls 20a have been previously exposed to conditions conducive to cause raising of the same through the action of the leavening agent therein. Preferably, the rolls 20a are approximately half-proof (half-raised).

Figure 2:
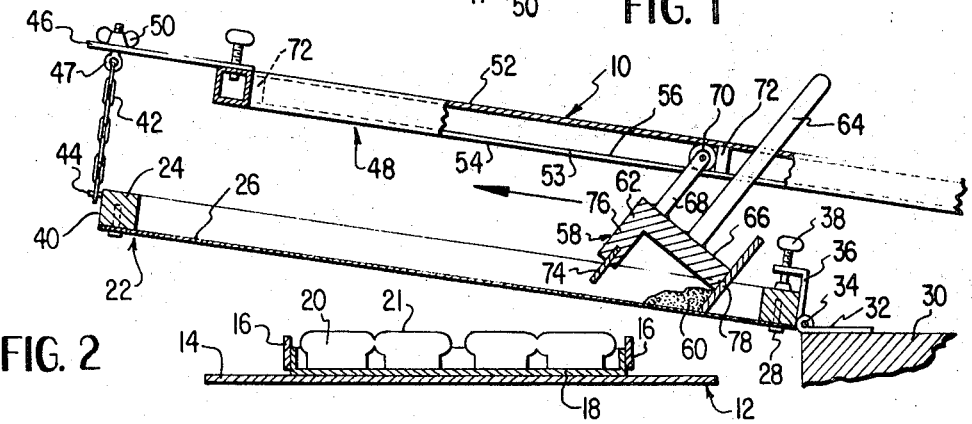
FIG. 2 is a cross-sectional, elevational view thereof.
Figure 3:
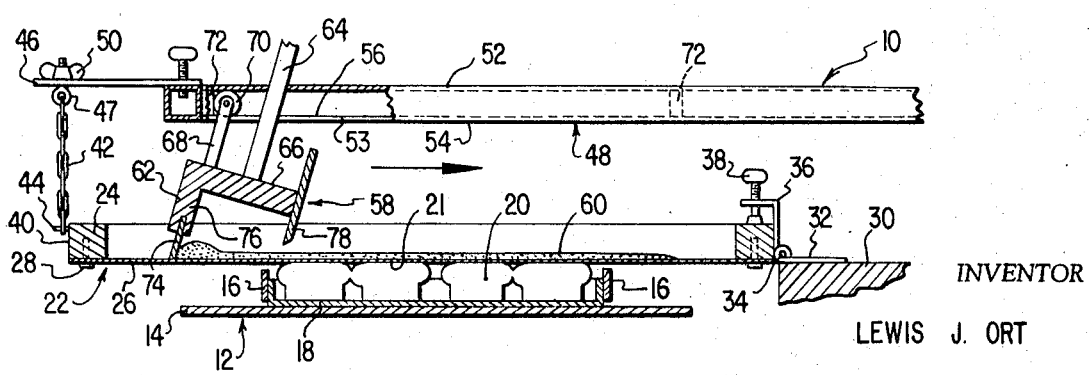
FIG. 3 is a cross-sectional, elevational view similar to FIG. 2 but with certain of the components of the apparatus in alternative positions.

Rolls 20a are moved by belt 14, in the direction of arrow 80 and into the position occupied by rolls 20b (indicated by dashed lines in FIG. 1). Mechanism 22 is then lowered from its FIG. 2 position to its FIG. 3 position. This operation causes the screen 26 to engage the tops 21 of the rolls 20 and to flatten tops 21 to thereby provide a smooth surface for receiving the desired indicia. Before mechanism 22 is lowered, assembly 58 is actuated by pivoting the same about the axis of wheels 70 until coater blade 78 is disposed adjacent screen 26 and squeegee 74 is disposed in spaced relationship to screen 26 (FIG. 2). Assembly 58 is then shifted toward chain 42 to deposit a thin coating of fluid 60 on screen 26 (FIG. 3). After mechanism 22 is lowered to bring screen 26 into contact with rolls 20, assembly 58 is actuated by pivoting the same about the axis of wheels 70 until squeegee 74 is in contact with the surface of screen 26 and blade 78 is remote from screen 26. Assembly 58 is thereafter shifted toward hinge 32 with squeegee 74 in tight contact with screen 26 to squeeze fluid 60 through the unsealed openings of screen 26 and thereby imprint indicia 82 on rolls 20. In this respect, fluid 60 is preferably a heat hardenable, edible mixture of sugar, NF titanium dioxide, aluminum sulfate, sodium carbonate, sodium benzoate, citric acid, water, certified color ingredients and oil.

After rolls 20 have been imprinted with indicia 82, rolls 20 are again moved in the direction of arrow 80 by belt 14 into the position of rolls 20c (FIG. 1) and are thereafter exposed to conditions conducive to causing the raising of rolls 20 to be completed by the action of the leavening agent therein. Thus, the indicia 82 on rolls 20 is enlarged.

After the raising of rolls 20 is completed, the same are baked in a conventional oven. Manifestly, the rolls 20 expand further during the baking process to further enlarge indicia 82.

The raising of rolls 20 after the indicia 82 is imprinted thereon firmly stretches the latter into the surface of the unbaked dough. Thereafter, when the rolls 20 are baked, the indicia hardens and is thereby firmly attached to the rolls. Manifestly, because of the two enlargements of the indicia (during raising and during baking), mechanism 22 and particularly screen 26 may be much smaller than similar equipment used for decorated previously baked rolls.

Having thus described in detail a preferred method and apparatus for achieving the various objects, aims and purposes of the invention, it is to be appreciated and will be apparent to those skilled in the art, that many changes could be made in the method and apparatus without altering the inventive concepts and principles thereof. Hence, it is intended that the scope of the invention be limited only to the extent indicated in the appended claims.

I claim:

1. A method for producing a leavened food product having indicia thereon, said method comprising the steps of:
preparing a soft doughy mass of edible starchy material including a leavening agent;
imprinting indicia on said mass with an edible fluid;
exposing the imprinted mass to conditions conducive to causing the same to raise and enlarge said indicia; and
baking the raised mass with the enlarged indicia thereon to thereby produce said product.

2. A method as set forth in claim 1 wherein is included the step of exposing the mass to conditions conducive to causing the same to raise prior to said imprinting step for a time period sufficiently long to only partially raise said mass.

3. A method as set forth in claim 1 wherein said imprinting step includes the step of silk screening said fluid on the mass.

4. A method as set forth in claim 2 wherein said fluid includes a food coloring agent.

5. A method as set forth in claim 4 wherein said fluid is heat hardenable.

6. A method for producing leavened food products having indicia thereon, said method comprising the steps of:
preparing a plurality of soft doughy masses of edible starchy material including a leavening agent;
exposing said masses to conditions conducive to causing the same to raise for a period of time sufficiently long for raising the same to approximately half proof;
simultaneously silk screening an edible, heat hardenable fluid onto each of said partially raised masses respectively to present indicia thereon;
exposing the masses with indicia thereon to raising conditions to complete the raising of the same and thereby enlarge each indicia; and
baking the raised masses with enlarged indicia thereon to thereby produce said products.

7. A method as set forth in claim 6 wherein said masses are positioned in side-by-side relationship on a moveable support to facilitate the simultaneous silk screening of the same.

8. A method as set forth in claim 6 wherein said fluid comprises sugar, titanium dioxide, aluminum sulfate, sodium carbonate, sodium benzoate, citric acid, water, certified color ingredients and oil.